United States Patent
Wah Lo et al.

[19]

[11] Patent Number: 5,548,362
[45] Date of Patent: Aug. 20, 1996

[54] PARALLAX CONTROLLABLE MULTIPLE-LENS CAMERA

[75] Inventors: Allen K. Wah Lo; Kenneth Q. Lao, both of Fulton County, Ga.

[73] Assignee: Image Technology International, Inc., Norcross, Ga.

[21] Appl. No.: 239,897

[22] Filed: May 9, 1994

[51] Int. Cl.$^6$ .................................................. G03B 35/08
[52] U.S. Cl. ............................................................ 354/114
[58] Field of Search ............................. 354/114, 121, 354/123, 125, 271.1; 355/22; 348/49

[56] References Cited

U.S. PATENT DOCUMENTS

| | | | |
|---|---|---|---|
| 3,387,547 | 6/1967 | Houghton | 95/36 |
| 3,590,709 | 7/1971 | Mikami | 95/18 |
| 3,590,712 | 7/1971 | Ataka | 95/36 |
| 3,611,899 | 10/1971 | Ataka | 95/18 R |
| 3,641,900 | 2/1972 | Ataka | 95/36 |
| 3,852,787 | 12/1974 | Nims et al. | 354/275 |
| 3,953,869 | 4/1976 | Wal Lo et al. | 354/115 |
| 3,960,563 | 6/1976 | Lo et al. | 96/40 |
| 4,063,265 | 12/1977 | Lo et al. | 354/294 |
| 4,073,950 | 2/1978 | Lo et al. | 352/58 |
| 4,086,585 | 4/1978 | Wah Lo et al. | 354/115 |
| 4,431,288 | 2/1984 | Iwata et al. | 354/446 |
| 4,475,798 | 10/1984 | Smith | 354/114 |
| 4,714,962 | 12/1987 | Levine | 358/209 |
| 4,800,407 | 1/1989 | Wah Lo | 354/114 |
| 4,814,802 | 3/1989 | Ogawa | 354/105 |
| 4,844,583 | 7/1989 | Lo | 350/132 |
| 5,349,403 | 9/1994 | Lo | 350/114 |

*Primary Examiner*—David M. Gray
*Assistant Examiner*—Christopher E. Mahoney

[57] ABSTRACT

A 3D camera having a plurality of taking lenses fixedly spaced to take a plurality of 2D images of a scene at different viewing angles wherein the parallax in 2D images can be controlled by adjusting the spacing between diaphragm stops behind the taking lenses.

17 Claims, 5 Drawing Sheets

PARALLAX CONTROLLABLE MULTIPLE-LENS CAMERA

BACKGROUND OF THE INVENTION

1. Field of Invention

The present invention relates generally to 3D photography, and more specifically to a multi-lens camera for taking a plurality of 2D images at different viewing angles wherein the spacing between lens apertures are adjustable to control the parallax.

2. Prior Art

In lenticular 3D photography, the basic process involves taking a plurality of two-dimensional (2D) images of a scene from a number of horizontally-spaced vantage points and exposing these 2D views on a lenticular print material at different projection angles to compose a 3D print. The most convenient way to take a number of 2D images of a scene is to use a camera having multiple taking lenses so that the views at different vantage points can be simultaneously captured.

Because 2D images are captured at different vantage points, they are slightly different one from another. The difference between 2D images, or the parallax, is due to the fact that the photographed objects in a scene are located at significantly different distances from the camera. The parallax in 2D images directly affects the quality of the composed 3D photograph. If the parallax is too little, then the 3D effect is poor. If the parallax is excessive, then the viewer may have difficulty in fusing together two 2D views of a stereo pair. Thus, it is essential to control the parallax when one takes the 2D views of a scene to ensure a good 3D effect on the composed 3D print. It should be noted that parallax in the 2D images is directly proportional to the distance between the horizontally-spaced vantage points.

In the past, a number of patents have disclosed multi-lens cameras for 3D photographic applications. U.S. Pat. No. 4,086,585 (Wah Lo et al.) discloses a multi-lens camera wherein the lens spacing is fixed; U.S. Pat. No. 4,800,407 (Wah Lo) discloses a 3D camera having three fixedly located lenses to provide 2D images for composing 3D photographs with a wider range of viewing angles; U.S. Pat. No. 4,475,798 (Smith) discloses a plural lens camera wherein the spacing between lenses is also fixed but each lens is independently adjustable so that the optical axes of the lenses can be made substantially parallel in a first plane and substantially coplanar in a second plane orthogonal to the first plane.

Using a multi-lens camera with a fixed lens spacing, one cannot control the parallax when taking a plurality of 2D images of a scene. Consequently, unless the objects in a photographed scene are located at proper distances, the parallax in the 2D images may be too little or excessive. U.S. Pat. No. 3,953,869 (Wah Lo et al.) discloses a camera with a plurality of taking lenses arranged in a straight path wherein the spacing between taking lenses is adjustable. A camera with adjustable lens spacing allows a photographer to control the parallax by moving the taking lenses in the horizontal directions thereby shortening or lengthening the spacing between those taking lenses. However, in order to keep the field of view of a taking lens unchanged, when the lens is moved, the image frame defining the boundary of the image formed by the same taking lens must also be moved by the same distance. Consequently, there are a number of major disadvantages associated with a multi-lens with adjustable lens spacing including: 1) the minimum spacing between two taking lenses is confined to the spacing between two image frames. As shown in FIG. 1 which depicts a prior art two-lens camera with adjustable lens spacing, the spacing D between the two taking lenses cannot be further reduced because the two image frames cannot be moved closer; 2) substantial film areas are unused and therefore wasted to allow for the moving of image frames; and 3) that the spacing between image frames on film is variable will certainly add complexity to the 3D image composing process.

It is an advantage to have a multi-lens 3D camera wherein parallax can be controlled over a reasonably large range while the image frames on film remain fixed in relation to each other.

The following U.S. Patents are also disclosed as of interest: U.S. Pat. No. 3,852,787 (Nims et al.), U.S. Pat. No. 3,960,563 (Loet al.), U.S. Pat. No. 4,037,950 (Loet al.), U.S. Pat. No. 4,063,265 (Loet al.) and U.S. Pat. No. 4,086,585 (Loet al.).

SUMMARY OF THE INVENTION

The objective of the present invention is to provide a method and an apparatus to produce 3D images with improved quality in that the parallax in the 2D images of a scene taken with a multi-lens camera can be properly adjusted to ensure a good 3D effect wherein the image frames in the multi-lens camera are fixed in relation to each other in order to simplify the 3D image composing process. This objective can be achieved by adjusting the spacing between the diaphragm stops behind the taking lenses in the multi-lens camera while keeping the spacing between the taking lenses unchanged, as shown in FIGS. 2–4. Unlike a multi-lens camera with adjustable lens spacing wherein the distance between two vantage points is the spacing D between the two corresponding taking lenses as shown in FIG. 1, in the multi-lens camera according to the present invention the distance between two vantage points is the spacing d between the diaphragm stops behind the two corresponding taking lenses as shown in FIG. 2. It is understood that all taking lenses in a multi-lens camera are substantially identical in their optical characteristics such as focal length, chromatic aberration and various spatial aberrations.

A further objective of the present invention is to provide a method and apparatus for acquiring and recording a plurality of 2D views of a single scene having means for adjusting parallax in the 2D views wherein the taking lens' field of view can be varied. This objective can be achieved by using a plurality of substantially identical zoom lenses as the taking lenses.

BRIEF DESCRIPTIONS OF THE DRAWINGS

FIG. 1 is a schematic presentation of a prior art 3D camera having two taking lenses 11 and 12 wherein the taking lenses can be horizontally moved to adjust the lens spacing D. As shown in FIG. 1, numerals 311 and 312 denote the optical axes of lens 11 and lens 12, respectively. Numerals 31 and 32 denote two diaphragm stops are placed behind the taking lenses such that the center of each diaphragm stop substantially coincides with the optical axis of the respective taking lens. Image frames 61 and 62 are areas of 2D images formed by taking lenses 11 and 12 on film 60 and defined by baffles 41, 51 and baffles 42, 52, respectively. Numeral 9 denotes a common shutter which simultaneously controls the exposure on both image frames 61 and 62. The lens spacing D between the taking lenses may be adjusted by moving the taking lenses in relation to each other in the horizontal directions. However, in order to keep the field of view of each taking lens unchanged, the baffles must be horizontally moved such that the locations of image frames 61 and 62 remain substantially fixed relative to optical axes 311 and 312, respectively. As shown in FIG. 1, baffle 51 is virtually touching baffle 42 and therefore the baffles cannot be moved further inward, limiting the minimum spacing D between the taking lenses.

DETAILED DESCRIPTIONS OF THE PREFERRED EMBODIMENT

Figure 2:
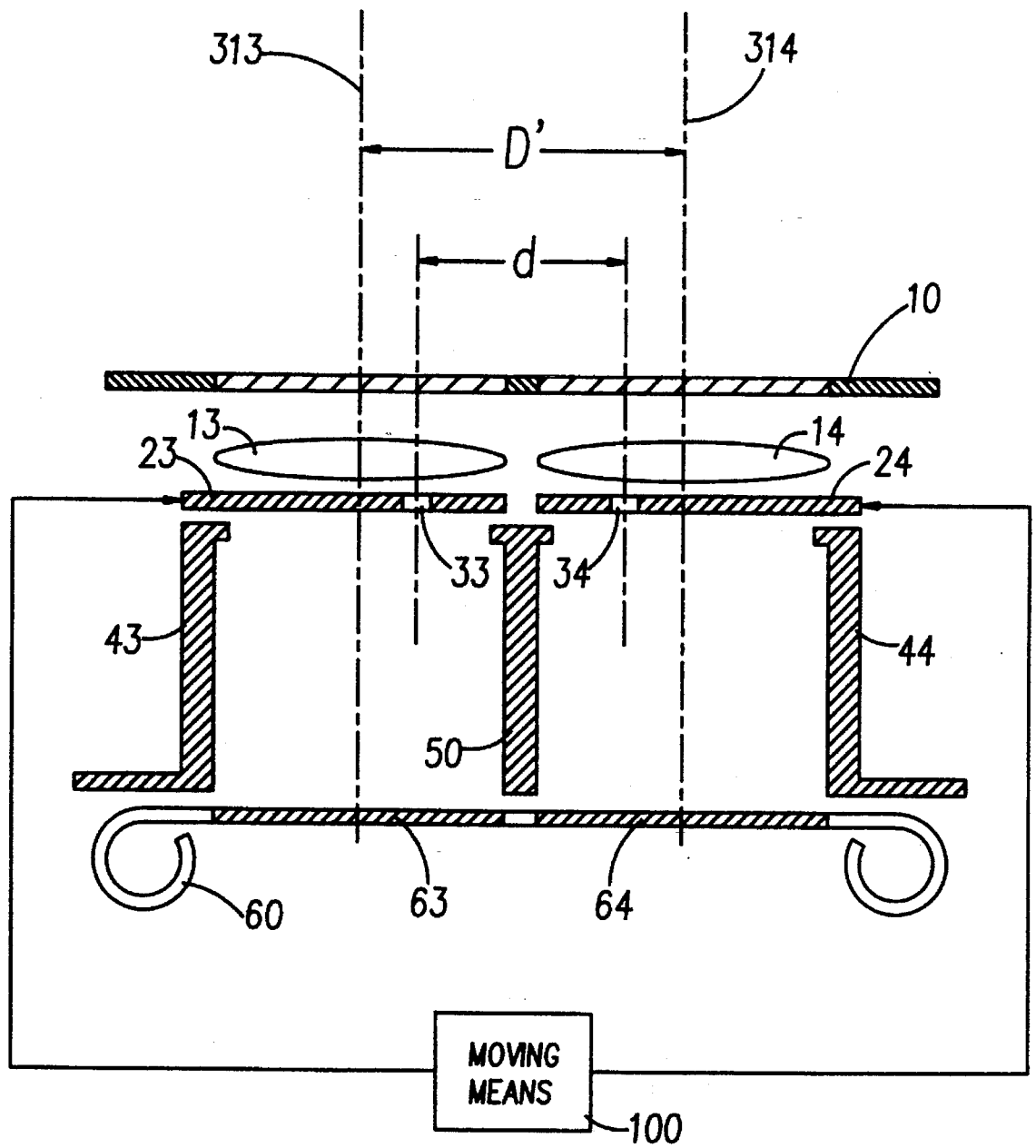
FIG. 2 is a schematic representation of a preferred embodiment of the multi-lens camera according to the present invention showing a 3D camera having two fixedly located taking lenses for forming 2D images on photographic film wherein the positions of the diaphragm stops are adjustable in the horizontal directions to change the distance between vantage points.
Figure 3:
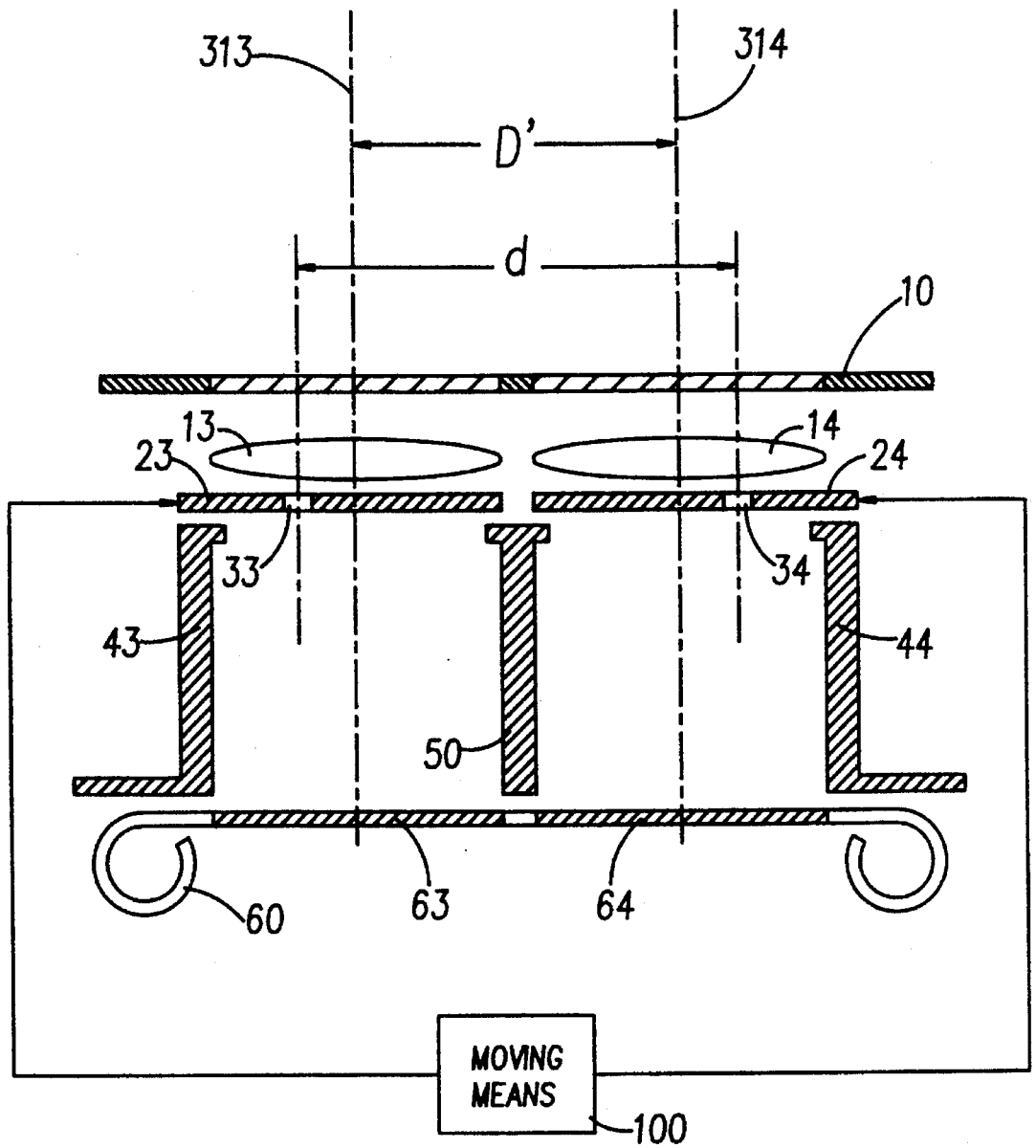
FIG. 3 is the same as FIG. 2 except that the diaphragm stops have been moved outward in the horizontal directions to increase the distance between vantage points and thus increase the parallax in the 2D images formed by the taking lenses.
Figure 4:
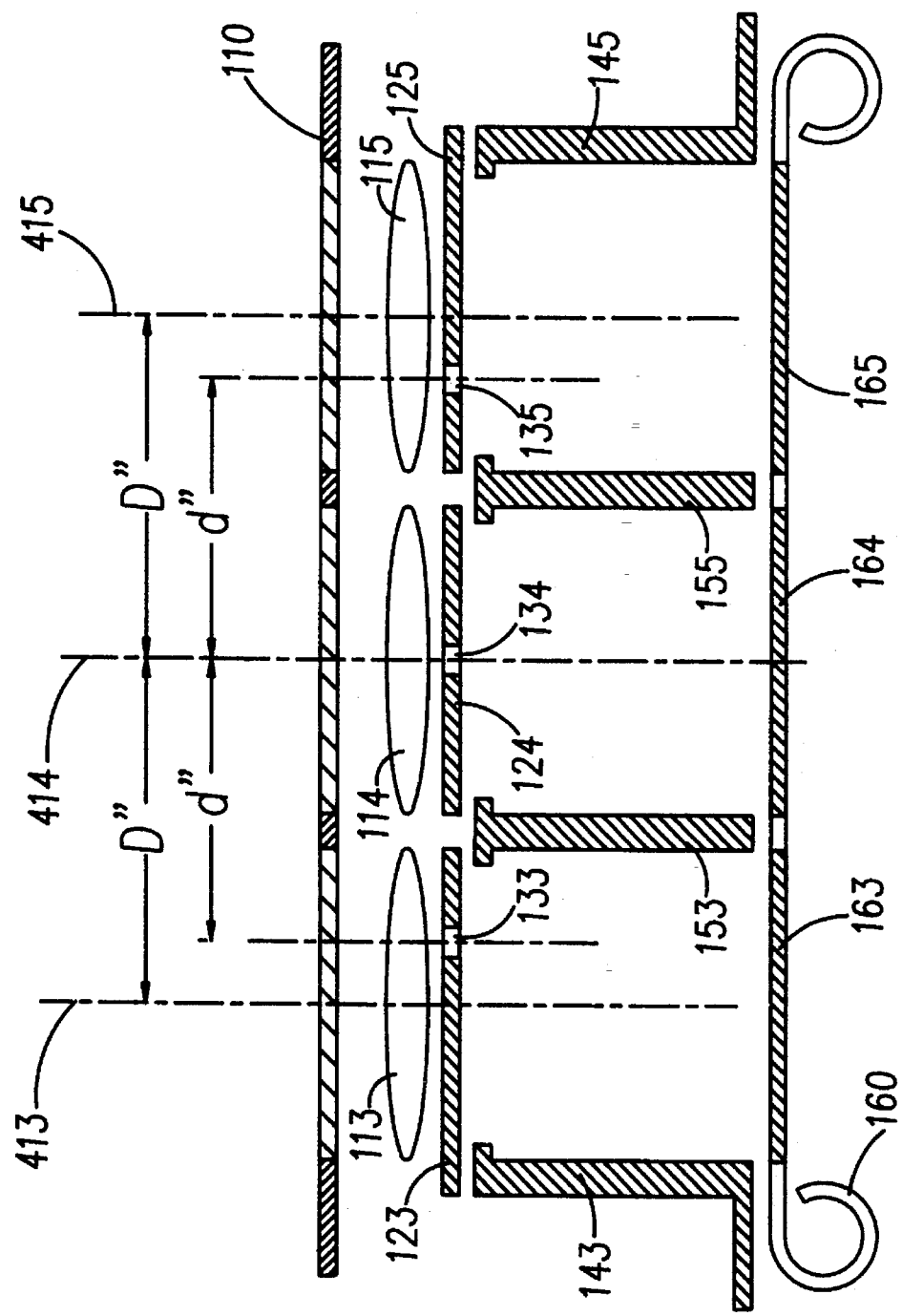
FIG. 4 is a schematic representation of a modified form of the preferred embodiment of the multi-lens camera according to the present invention showing a 3D camera having three fixedly-located taking lenses wherein the positions of the two side diaphragm stops are adjustable in the horizontal directions to change the distance between adjacent vantage points.
Figure 5:
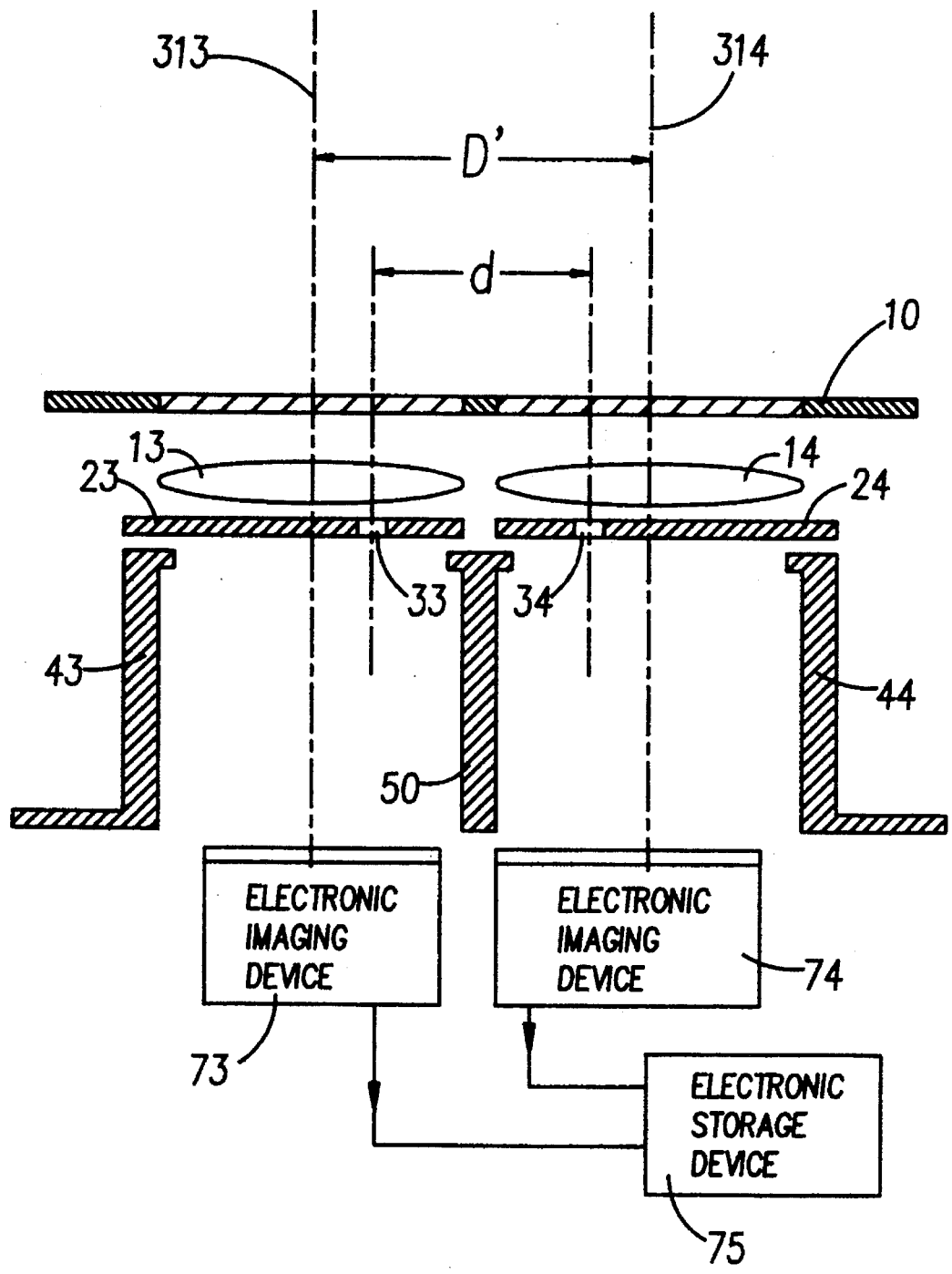
FIG. 5 is a schematic representation of another modified form of the preferred embodiment of the multi-lens camera according to the present invention wherein the 2D images are formed on a plurality of electronic imaging devices which transfer the image information to one or more electronic storage devices.

In a preferred embodiment of the multi-lens camera according to the present invention a plurality of fixedly-located taking lenses with adjustable diaphragm stops are used to take a plurality of 2D images of a single scene and recorded these images on a roll or a strip of photographic film as shown in FIG. 2 to FIG. 4, or recorded on electronic media as shown in FIG. 5. For illustration purposes only, FIG. 2 illustrates a 3D camera comprising two large-aperture taking lenses 13 and 14 preferably both having an F-number ranging from 0.9 to 3.0; a common shutter 10 with shutter speed ranging from 1/1000 to 20 seconds with T and B mode for exposure control; two diaphragm stops or aperture plates 23 and 24 having, respectively, openings 33 and 34 which are adjustable in size by adjusting means for controlling image sharpness and exposure; three baffles 43, 44 and 50 which are fixedly located to define the areas of image flames 63 and 64 formed, respectively, by taking lenses 13 and 14 on photographic film 60. Optical axes 313 and 314 of the taking lenses define a reference plane which is orthogonal to the film plane of film 60 while the horizontal axis of the camera is parallel to both the reference plane and film plane. Diaphragm stops 23 and 24 may be mounted behind the respective taking lenses on sliding rails so that they can be moved by moving means 100 in opposite horizontal directions to change the spacing between openings 33 and 34 while the centers of opening 33 and 34 are substantially equidistant in relation to the optical axes of their respective taking lenses. Alternatively, diaphragm stops 23 and 24 may be constructed using an electro-optic device such as a liquid crystal light valve so that two sections of the light valve are activated by electronic means to transmit light and thus replacing openings 33 and 34. In FIG. 2, the spacing d between opening 33 and opening 34 is smaller than the spacing D' between taking lenses 13 and 14. It can be seen from FIG. 2 that d can be further shortened for further reducing the parallax so long as openings 33 and 34 are located within the optical aperture of the respective lenses. It is preferred that both taking lenses 13 and 14 have a large aperture to increase the range of adjustable spacing between openings 33 and 34. The diaphragm stops may also be mounted in front of the taking lenses. If each of the taking lenses is a lens assembly comprising a primary lens and a secondary lens, then each diaphragm stop may also be placed between the primary and the secondary lens. The common shutter may also be placed behind or in front of the lenses or the diaphragm stops.

Figure 1:
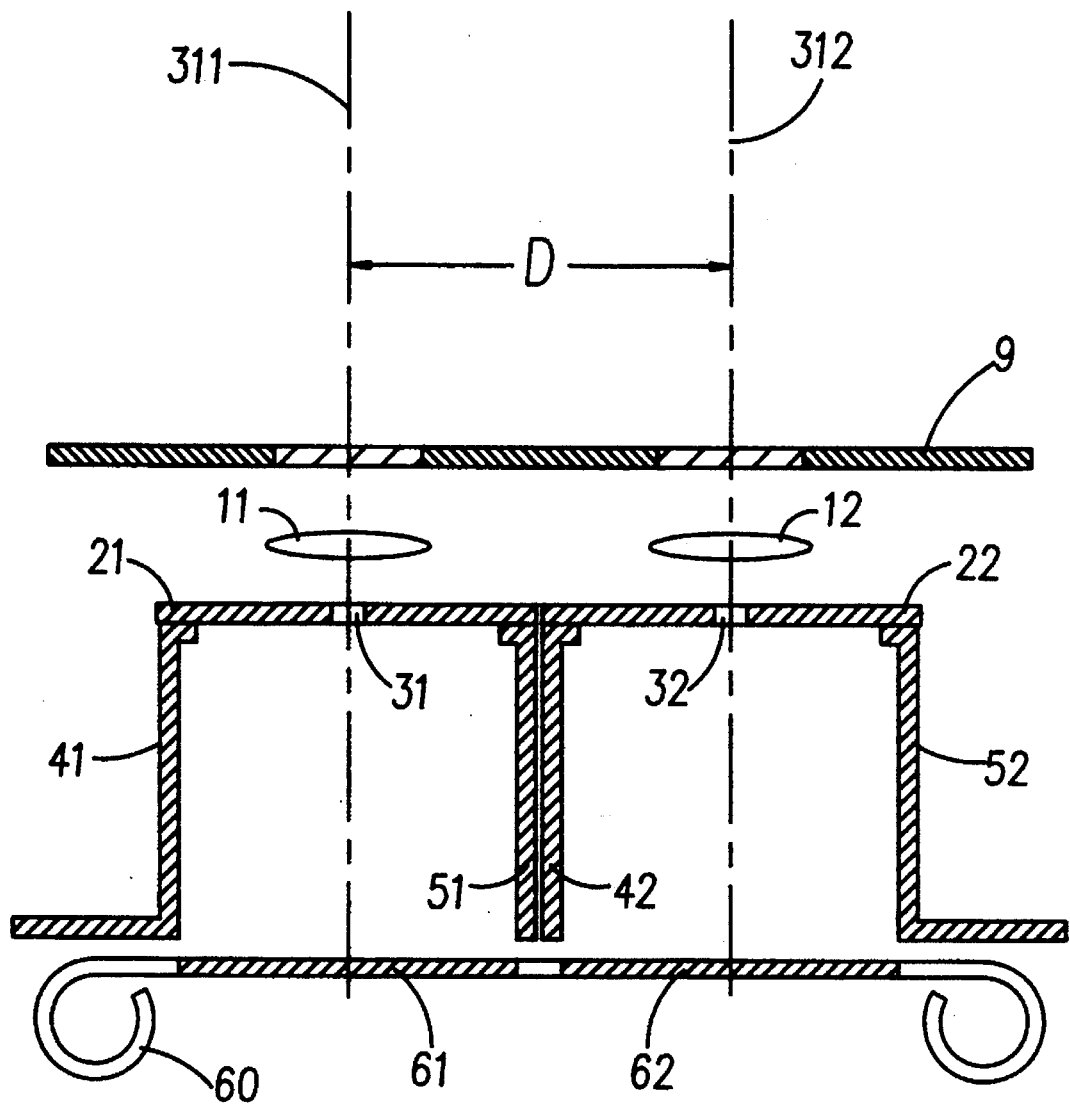

The 3D camera illustrated in FIG. 3 is the same as the two-lens camera of FIG. 2 except that the diaphragm stops 23 and 24 have been moved outward such that the spacing d between openings 33 and 34 is greater than the spacing D' between the taking lenses. It can be seen from FIG. 3 that d can be further extended to increase the parallax. Unlike the 3D camera with adjustable lens spacing illustrated in FIG. 1 wherein the distance between adjacent vantage points is the spacing between the taking lenses, in the 3D camera according to the present invention as illustrated in FIG. 2 the distance between adjacent vantage points is the spacing between the openings in the diaphragm stops. Thus, it can be seen from FIG. 2 and FIG. 3 that the range of the adjustable distance between adjacent vantage points in the 3D camera according to the present invention is much greater than that in the prior art camera shown in FIG. 1. It should be also noted that because image frame 63 and image frame 64 are fixedly located, no unused film areas are needed to allow for the spacing changes of vantage points.

In order to alter the field of view of the taking lenses, taking lenses 13 and 14 can be substantially identical zoom lenses.

FIG. 4 illustrates a multi-lens camera representing a modified form of the preferred embodiment according to the present invention. For illustration purposes only, FIG. 4 shows a 3D camera comprising three fixedly-located taking lenses 113, 114 and 115; a common shutter 110; three diaphragm stops 123, 124 and 125 having, respectively, openings 133, 134 and 135 which are adjustable in size for image sharpness and exposure control; four baffles 143, 153, 155 and 145 which are fixedly located to define the areas of image frames 163, 164 and 165 formed, respectively, by taking lenses 113, 114 and 115 on film 160. In FIG. 4, optical axes 413, 414 and 415 of the taking lenses are equidistantly spaced. Diaphragm stops 123, 124 and 125 may be mounted behind their respective taking lenses such that the center of opening 134 substantially coincides with optical axis 414 while openings 133 and 135 can be moved inward or outward in opposite horizontal directions to equally change the spacing between adjacent openings. As shown inn FIG. 4, the spacing d" between adjacent openings is smaller than the spacing d" between adjacent taking lenses but d can be greater than D". It is understood that even though all taking lenses must be substantially identical in their optical characteristics such as focal length and lens aberrations, the center lens can be smaller in width than the side lenses which are preferably of the same size.

FIG. 5 illustrates a multi-lens camera representing another modified form of the preferred embodiment according to the present invention. The 3D camera of FIG. 5 is the same as the 3D camera of FIG. 2 except that 2D images are recorded electronically, instead of being recorded on film. As shown in FIG. 5, 2D images are formed on a plurality of electronic imaging devices 73 and 74 which transfer the image information to an electronic storage device 75. Electronic imaging devices can be CCD sensor arrays or vidicon tubes. The electronic storage device can be selected from the group comprising a magnetic tape, a magnetic card, a computer hard disk, a floppy disk and a photo-CD.

While the present invention has been described with reference to the preferred embodiment, it shall be understood by those skilled in the art that various changes may be made and components may be substituted without departing from the scope of the invention.

What is claimed is:

1. A 3D camera for acquiring and recording a plurality of 2D images of a single scene at different viewing angles with parallax in said 2D images being adjustable, said camera comprising:

a plurality of fixedly located taking lenses;

a plurality of diaphragm stops having openings for transmitting light rays through said taking lenses to form said 2D images;

a shutter for controlling transmission of light rays through said openings and said taking lenses;

means for horizontally moving said diaphragm stops to adjust the spacing between said openings;

fixedly located baffles for defining image frames of said 2D images; and image recording means for recording said 2D images.

2. The 3D camera according to claim 1 wherein said image recording means comprises photographic film.

3. The 3D camera according to claim 1 wherein said image recording means comprises at least one electronic imaging device.

4. The 3D camera according to claim 3 further comprising an image storage device for storing images conveyed from said at least one electronic imaging device.

5. The 3D camera according to claim 4, wherein said image storage device comprises a magnetic tape.

6. The 3D camera according to claim 4, wherein said image storage device comprises a magnetic card.

7. The 3D camera according to claim 4, wherein said image storage device comprises a computer hard disk.

8. The 3D camera according to claim 4, wherein said image storage device comprises a floppy disk.

9. The 3D camera according to claim 4, wherein said image storage device comprises a photo-CD.

10. The 3D camera according to claim 3, wherein said electronic imaging device comprises a CCD sensor array.

11. The 3D camera according to claim 3, wherein said electronic imaging device comprises a vidicon tube.

12. The 3D camera according to claim 1 wherein said diaphragm stops comprises an electro-optic light valve having light transmitting windows with the spacing between windows being adjustable.

13. The 3D camera according to claim 12, wherein said electro-optic light valve comprises a liquid crystal light valve.

14. The 3D camera according to claim 1 wherein each of said taking lenses comprises a substantially identical zoom lens for equally changing the field of view of each of said taking lenses.

15. The 3D camera according to claim 1 wherein said openings on said diaphragm stops may be adjustable in size.

16. A method of acquiring and recording a plurality of 2D images of a single scene at different view angles with adjustable parallax in a 3D camera, said camera comprising a plurality of fixedly located taking lenses, a plurality of horizontally movable diaphragm stops having openings for transmitting light rays through said taking lenses to form said 2D images, a shutter for controlling transmission of light rays through said openings and said taking lenses, and fixedly located baffles for defining image frames of said 2D images, said method comprising moving said diaphragm stops horizontally, and thereby changing the spacing between said openings in said diaphragm stops to control parallax in said 2D images.

17. The method according to claim 16, wherein said camera further comprises an image recording means for recording said 2D images formed by said taking lenses.

* * * * *